United States Patent
Igodt

(10) Patent No.: US 9,002,633 B2
(45) Date of Patent: Apr. 7, 2015

(54) METHOD OF DETERMINING AND VALIDATING NAVIGATIONAL PRIORITY SETTINGS UTILIZING PROBE DATA

(75) Inventor: Bert Igodt, Vichte (BE)

(73) Assignee: TomTom Belgium N.V., Gent (BE)

( * ) Notice: Subject to any disclaimer, the term of this patent is extended or adjusted under 35 U.S.C. 154(b) by 163 days.

(21) Appl. No.: 13/880,743

(22) PCT Filed: Oct. 22, 2010

(86) PCT No.: PCT/EP2010/065938
§ 371 (c)(1),
(2), (4) Date: Apr. 22, 2013

(87) PCT Pub. No.: WO2012/052062
PCT Pub. Date: Apr. 26, 2012

(65) Prior Publication Data
US 2013/0211700 A1   Aug. 15, 2013

(51) Int. Cl.
*G01C 21/26* (2006.01)
*G01C 21/32* (2006.01)

(52) U.S. Cl.
CPC ............ *G01C 21/26* (2013.01); *G01C 21/32* (2013.01)

(58) Field of Classification Search
None
See application file for complete search history.

(56) References Cited

U.S. PATENT DOCUMENTS

| | | | |
|---|---|---|---|
| 5,948,042 A | 9/1999 | Heimann et al. | |
| 7,327,280 B2 * | 2/2008 | Bachelder et al. | 340/906 |
| 7,969,324 B2 * | 6/2011 | Chevion et al. | 340/901 |
| 2007/0008174 A1 * | 1/2007 | Schwartz | 340/902 |
| 2008/0167821 A1 * | 7/2008 | Breed | 701/301 |
| 2010/0073194 A1 * | 3/2010 | Ghazarian | 340/901 |
| 2012/0310517 A1 * | 12/2012 | van den Oever | 701/300 |

FOREIGN PATENT DOCUMENTS

| | | |
|---|---|---|
| JP | 2005062854 A | 3/2005 |
| JP | 2005174282 A | 6/2005 |
| JP | 2005174314 A | 6/2005 |
| JP | 2005267470 A | 9/2005 |
| JP | 2005267471 A | 9/2005 |
| JP | 2005267472 A | 9/2005 |
| JP | 2006059058 A | 3/2006 |
| JP | 2007328573 A | 12/2007 |
| JP | 2010079634 A | 4/2010 |

OTHER PUBLICATIONS

International Search Report issued Jul. 21, 2011 for International Application No. PCT/EP2010/065938.
Pribe C A et al: "Learning to associate observed driver behavior with traffic controls", Transportation Research Record, No. 1679, 1999, XP002647126, National Research Council.

* cited by examiner

Primary Examiner — Jason Holloway

(57) ABSTRACT

A method for determining vehicle priority settings (30) at an intersection (26) is provided comprising accumulating probe data (24) from a plurality of individual navigation units (20). An intersection within a digital map (14) is selected, and a plurality of probe traces (32) are selected. The probe traces (32) are processed in a method characterized by selecting a pair of probe traces (32) that enter the intersection (26) at the same time on different trajectories (34). It is determined which of the probe traces (32) proceeds through the intersection first and an intersection priority matrix (36) is updated accordingly. This intersection priority matrix (36) is utilized to formulate at least one derived intersection priority setting (38).

18 Claims, 6 Drawing Sheets

METHOD OF DETERMINING AND VALIDATING NAVIGATIONAL PRIORITY SETTINGS UTILIZING PROBE DATA

CROSS-REFERENCES TO RELATED APPLICATIONS

This application is the National Stage of International Application No. PCT/EP2010/065938, filed Oct. 22, 2010 and designating the United States. The entire content of this application is incorporated herein by reference.

BACKGROUND OF THE INVENTION

1. Field of the Invention

This invention relates generally to a system and method for determining and validating vehicle priorities at geographical roadway intersections. More particularly, this invention relates to a method for validating vehicle priorities utilizing probe data.

2. Related Art

Digital maps comprise a collection of data compiled and formatted into a virtual representation of land features, related objects and services as they exist in reality. The goal of most digital map providers is to produce maps that give accurate representations of a particular area, detailing major road arteries and point features. As the detail of such digital maps, and the navigation systems that utilize them, increases the ability to verify the accuracy of these details becomes increasing difficult.

A recent approach to increasing the accuracy of road location and traffic direction has been to utilize crowd sourcing. The concept of crowd sourcing utilizes a large number of users utilizing navigational devices, such as personal navigation devices, during their routine travels. The users develop data during such travels as their navigational devices continuously monitor their location and travel. The data can be collected actively, wherein the users actively link their devices with the mapping company to upload data or identify corrections to the mapping data. In addition, the data can be collected passively utilizing software located on the navigational devices. The popularity of commercial applications for use on personal devices such as cell phones provides a convenient and efficient method for passively collecting map data.

The primary usage of such probe data has been for verification of the geographic location of road elements within digital maps. If a given road's geometry is not reflected accurately within a digital mapping system, regular traffic over the road combined with sufficient probe data received from such traffic will allow for an accurate correction of existing data. Similarly, it is known that such probe data may be utilized to monitor and report on real time traffic congestion. This traffic information is utilized by navigation systems to provide users with more accurate travel times in addition to the calculation of faster routes.

It would be desirable, however, to utilize crowd sourcing and the related probe data to determine and verify more information than simply road location and traffic speed. Rather, it would be highly desirable to access this data to provide new and detailed information for digital maps and navigation that would further increase utility to users. One such arena would be the analysis of road intersections. At the intersection of two or more roads, vehicles traveling in different directions will have varied rights of way. Often this is dictated by road signs or traffic lights but may also be controlled by traditional right of way rules. In present digital maps and navigational systems, however, this detail is not considered or reported. This information would be useful both to operators as well as road planners.

It is therefore an object of the present invention to provide a method of determining and validating vehicle priorities at road intersections. It is a further object of the present invention to utilize probe data to determine and validate these vehicle priorities.

SUMMARY OF THE INVENTION AND ADVANTAGES

These and other objects and advantages are achieved according to one aspect of the invention by a method for verifying vehicle priority settings at an intersection comprising accumulating probe data from a plurality of individual navigation units. An intersection within a digital map is selected, and a plurality of probe traces are selected. The probe traces are processed by selecting a pair of probe traces that enter the intersection at the same time on different trajectories. It is determined which of the probe traces proceeds through the intersection first and an intersection priority matrix is updated accordingly. This intersection priority matrix is utilized to formulate at least one derived intersection priority setting.

The present invention provides advantages over the prior art by allowing for a detailed analysis of existing intersections and a determination of the rules that govern them without requiring the map developers to physically inspect a particular intersection. Additionally, the present invention provides advantages by allowing an analysis of real traffic patterns and comparing them to presumed priorities to either verify, correct, or even suggest changes to existing priorities.

BRIEF DESCRIPTION OF THE DRAWINGS

FIG. 5 is a first example of an intersection priority matrix in accordance with the present invention.

FIG. 7 is an alternate illustration of an intersection priority matrix in accordance with the present invention.

DETAILED DESCRIPTION OF THE PREFERRED EMBODIMENT

Referring to the Figures, wherein like numerals indicate like or corresponding parts throughout the several views, this invention pertains to digital transportation network navigation systems and to the digital maps, databases and devices used by navigation systems. By "digital transportation network", it is meant to include digital mapping systems for various established transportation networks, including various roadway surfaces for motorized and non-motorized vehicles, walking, biking, skiing and hiking trails, and other established routes along which users of navigations devices travel for business or pleasure. For purposes of this invention, the term "roadway" is intended to be used in a most general way and to be inclusive of all paved and unpaved roads, paths, trails and the like for use by any type of vehicle or a pedestrian.

Figure 1:
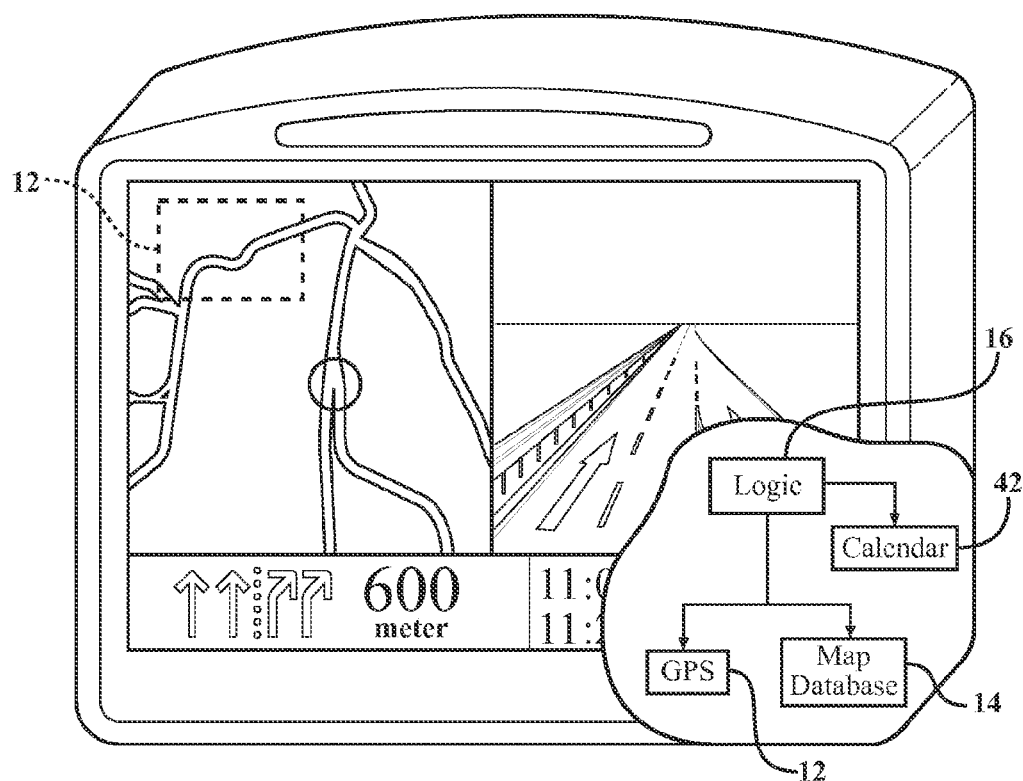
FIG. 1 is an embodiment of a navigation device in accordance with the present invention.
Figure 2:
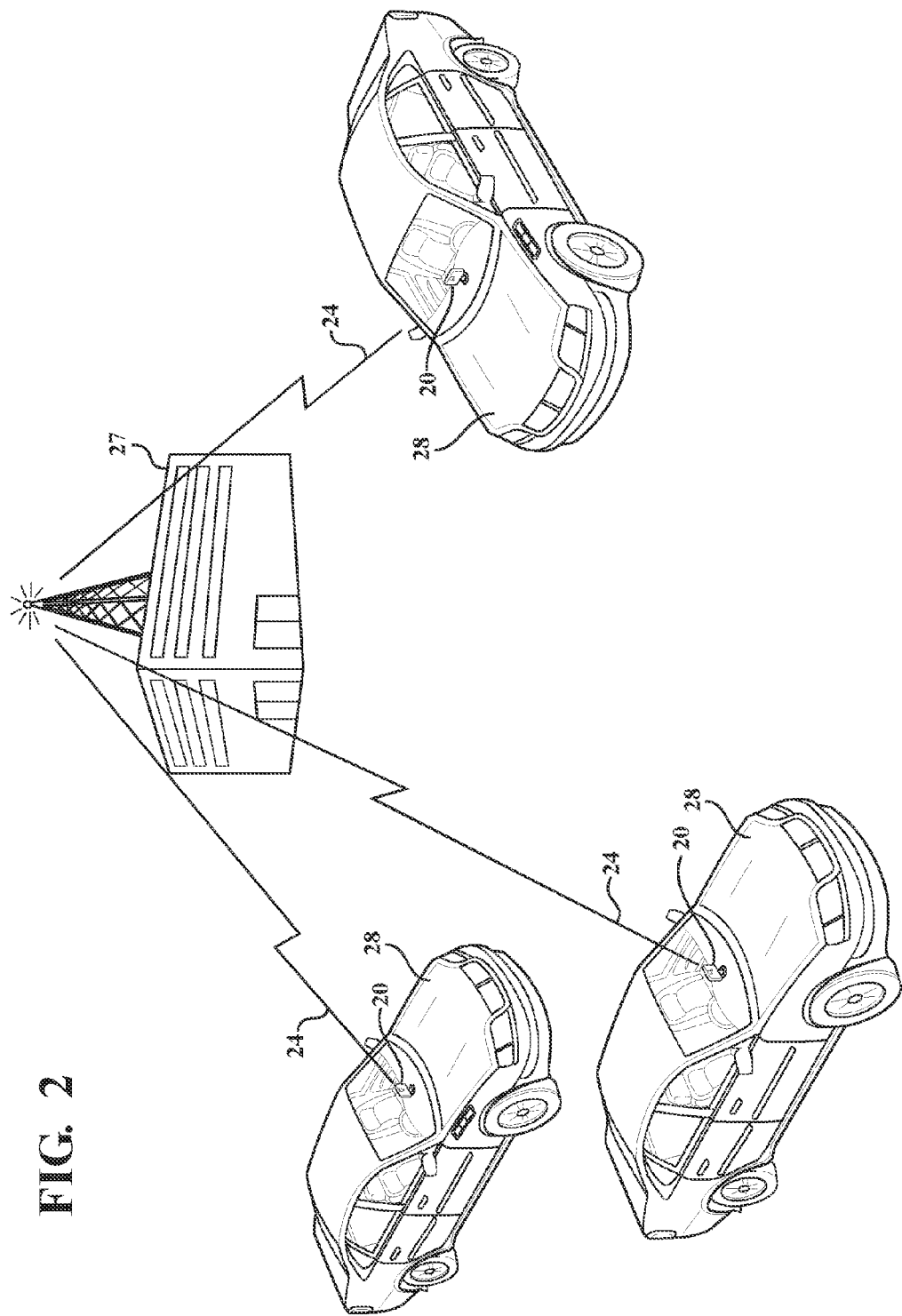
FIG. 2 is an illustration of the collection of probe data in accordance with the present invention.

Referring now to FIG. 1, which is a navigational device 10 in accordance with the present invention. Navigational devices 10 commonly utilize software 15 to pair global positioning elements 12 with a map database 14 such that a logic 16 may determine the location specific directions and mapping illustrations 18 can be provided. The present invention contemplates the use of crowd sourcing techniques to develop a database of useful information. In this scenario a plurality of unrelated or individual navigational units 20 record data as they are utilized and the data is collected by a central server 22 (see FIG. 2). This may be accomplished either actively or passively. The increased usage of navigational software on cell phones and other devices with internet connectivity allows for efficient retrieval of this data. As internet connectivity within automobiles is increased, it is expected that the quantity of reliable data will only increase. The probe data 24 from these units 20 is accumulated and stored at the central server 22.

Figure 3:
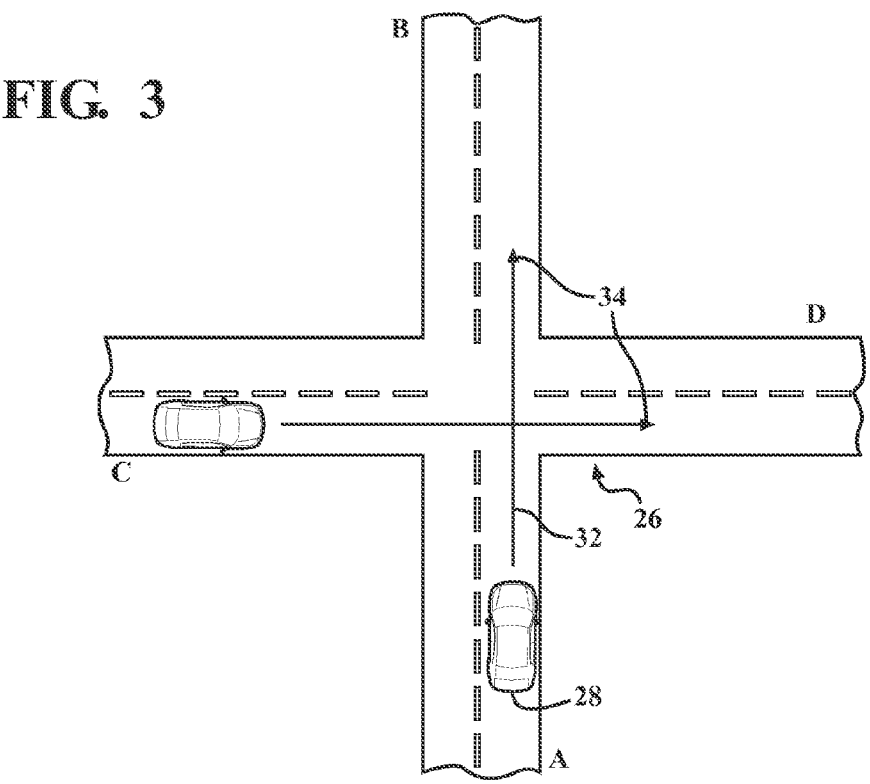
FIG. 3 is an illustration of an intersection to be analyzed by the present invention

The present invention provides a unique approach to utilizing this probe data 24 gleaned from the plurality of individual navigation units 20. The present invention utilizes this probe data 24 to determine and verify features of road intersections 26 as illustrated in FIG. 3. It should be understood that the term "intersection" is meant to encompass any geographical feature where multiple traveling paths in varied directions intersect. Although a simple two route intersection is depicted, it should be understood that a wide variety of intersections with varied complexity and numerous route crossings are contemplated. As vehicles pass through an intersection 26, the probe data 24 will record their speed, direction, and position. In the illustrated example, vehicles may be traveling in any direction and may either pass through the intersection or turn into any other direction. For the sake of reference, vehicle direction will be referred to from starting location to ending location. In other words A-B means travel from A to B. If two vehicles 28 arrive at the intersection 26 at the same time a vehicle priority determines which vehicle has the right of way should their paths conflict. This may be dictated by the present of road signs (stop, yield, etc.), traffic lights, or may even be governed by traditional right of way rules. The present invention provides a unique way of determining and validating such priorities.

Figure 4:
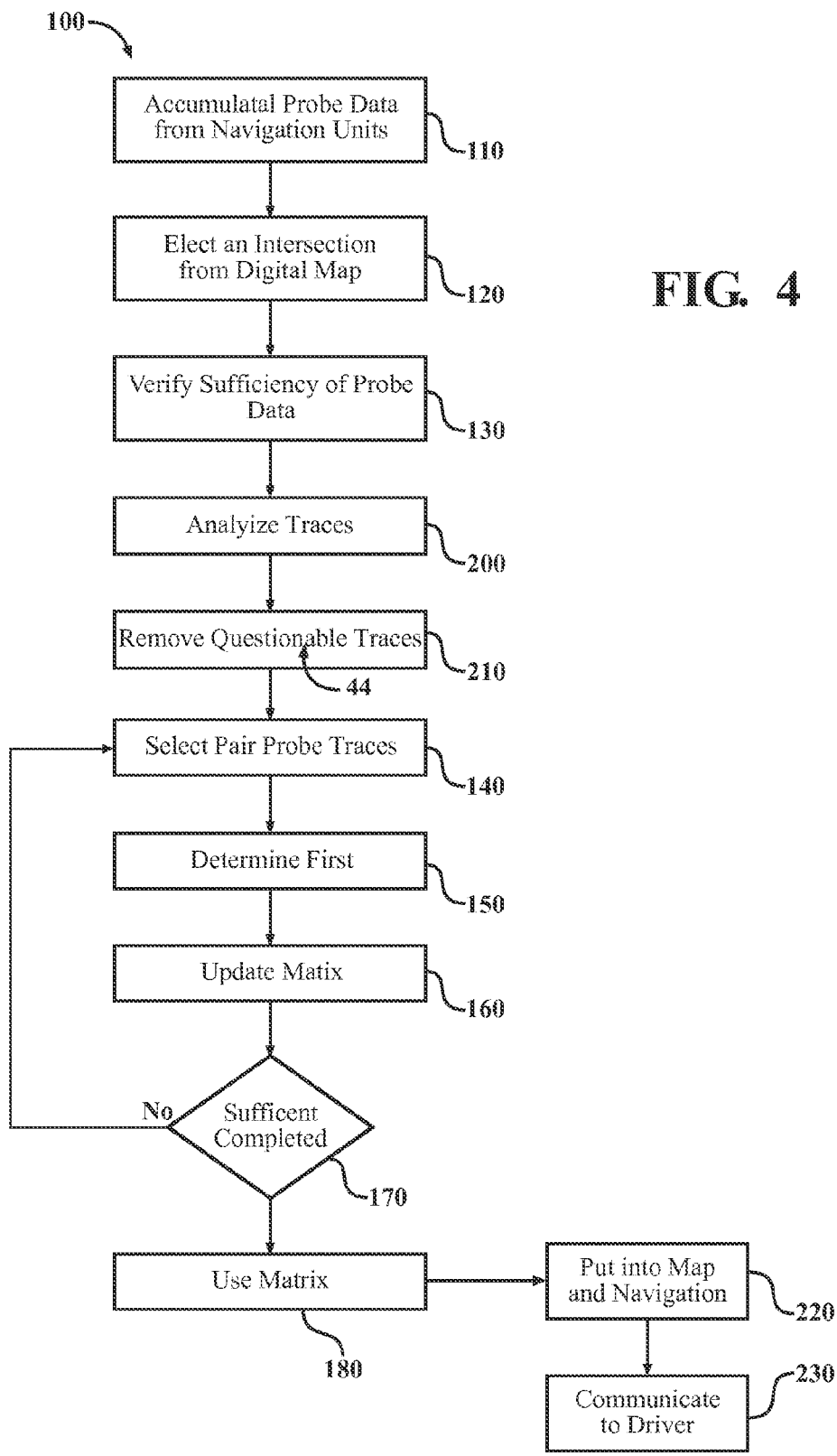
FIG. 4 is a flowchart of the method of the present invention.

The present invention provides a method 100 (FIG. 4) for determining or verifying vehicle priority settings 30 at an intersection 26 by accumulating 110 probe data 24 from a plurality of individual navigation units 20. The probe data 24 associated with a particular vehicle 28 as it passes through the intersection 26 is referred to as a probe trace 32. After accumulating the probe data 24 the present invention selects 120 an intersection 26 from within a digital map 14. A given digital map 14 may include a large number of intersections 26. These may be processed in any order. Optionally, specific intersections 26 may be targeted from within the digital map based on any developmental criteria such as volume of traffic.

Once an intersection 26 has been selected 120, the sufficiency of the probe data 24 that exists for this particular intersection 26 is evaluated 130. Since the present invention relies on interpreting the probe data 24 present at the intersection 26, the amount of such data 24 must be sufficient to produce reliable results. One skilled in the art, in light of the present disclosure, would understand the nature of such statistical requirements. Sufficiency may be based on relatively little data if consistent. Significant data points, however, may be necessary for complex intersections or as a result of inconsistent data. If the probe data 24 proves sufficient, a plurality of probe traces 32 are retrieved 130 for the given intersection 26. A pair of probe traces 32 are selected 140 that enter the intersection 26 on different trajectories 34 at approximately the same time. Normal variation in arrival time in combination with vehicle speed may be utilized to determine if the vehicles arrive at the "same time". When vehicles 28 enter an intersection at the same approximate time, rules based on right of way, signage, or traffic lights dictate that one has priority over the other. These real life controls and directions, however, are not known to existing digital mapping systems.

The present invention therefore determines 150 which of the probe traces 32 proceeds through the intersection 26 first in order to collect data for deriving the nature of such controls or directions. The present invention utilizes this information to update 160 an intersection priority matrix 36 to indicate which of the pair of probe traces 32 went first. The processing 170 of new pairs of probe traces 32 is then continued for the given intersection 26 until the matrix 36 is sufficiently populated or the probe data 24 is exhausted. The matrix 36 can then be utilized 180 to calculate a derived intersection priority setting 38. It is contemplated that the matrix 36, or similar statistical determination system, may be populated in a variety of fashions. In one example, for each pair of probe traces 32, the correct cell in the matrix 36 is updated. Once all the pairs 32 have been processed, the matrix 36 which has been populated is compared with a list of reference matrixes. As the priority setting of the reference matrix is known (stop lights, etc.) the priority setting of the intersection in focus can be determined. It should be understood that the comparison may look for matching percentages. It should further be understood that as not all vehicles will properly follow the rules of a real intersection, the derived matrix 36 may not contained absolute values of 0, 50 or 100%, but may instead contain intermediate values (although as will be appreciated, these intermediate values will typically be close to, i.e. be approximately, 0, 50 or 100%).

Figure 5:
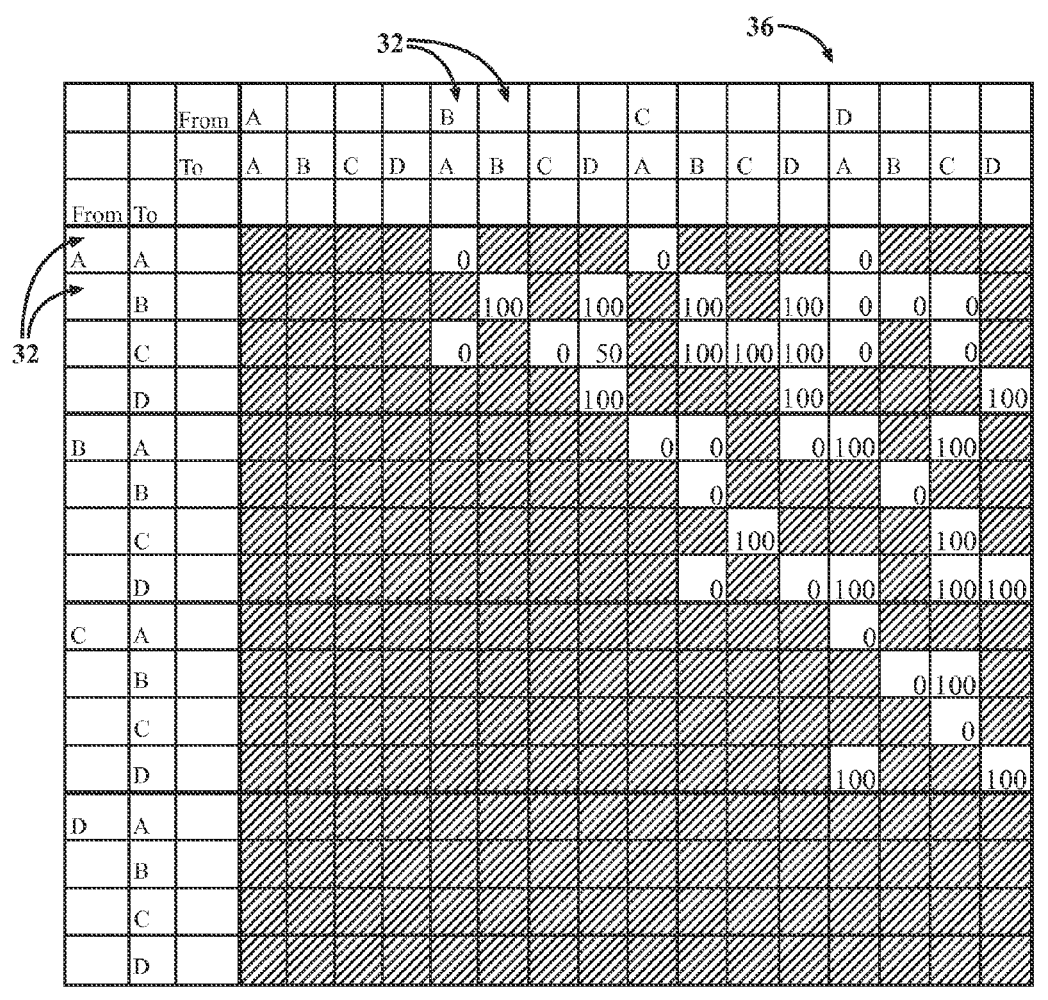

One embodiment of an intersection priority matrix 36 is illustrated in FIG. 5. The matrix 36 shown illustrates the direction of the compared probe traces 32 with the percentages indicating the percentage of time the a vehicle driving in the directions represented by the row took priority over a vehicle traveling in the direction represented by the column. For reference to the intersection 26 upon which the matrix 36 in FIG. 5 is based, see FIG. 3. For example a vehicle driven from A-B (row) as compared to a vehicle driven from D-C (column) is shown with a zero representation. This means that the car indicated in the row (A-B) would never have the priority over the car in the column (D-C). Although the percentages are illustrated as zero or 100, it is contemplated that they may not be absolute but still reliable if their percentages are high enough. In addition, it is contemplated that the values may also be approximately 50% where neither vehicle has a priority. One example would be two approaching vehicles turning left from a right side driving lane. In such a case, the lack of priority would comprise the priority setting 38 and be utilized in a informative way similar to the right of way priorities as an informative indication.

Figure 6:
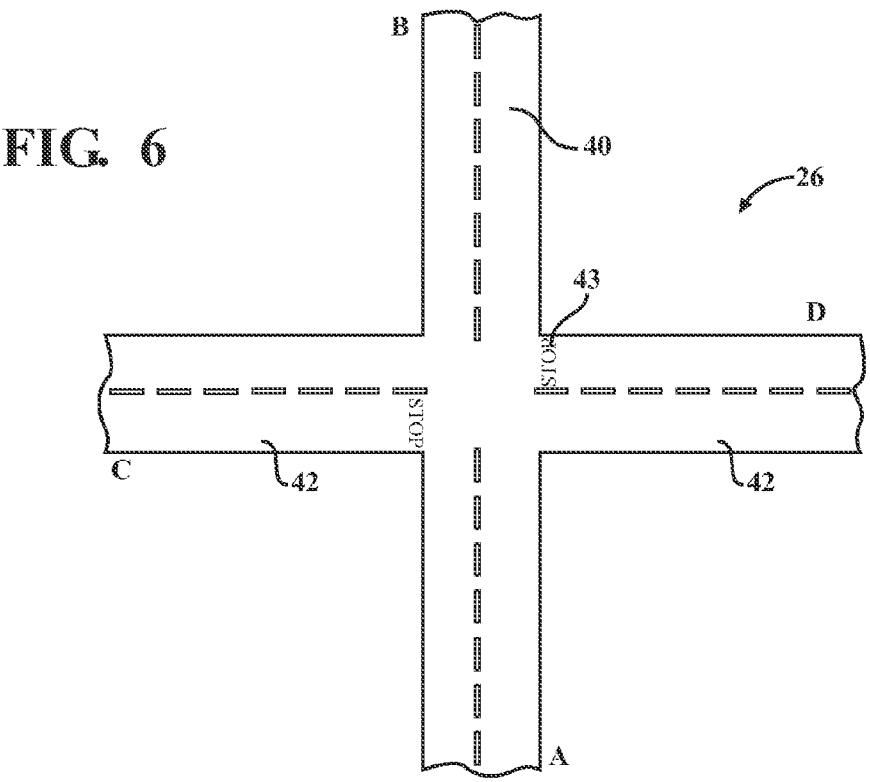
FIG. 6 is an alternate illustration of an intersection as illustrated in FIG. 3.
Figure 7:
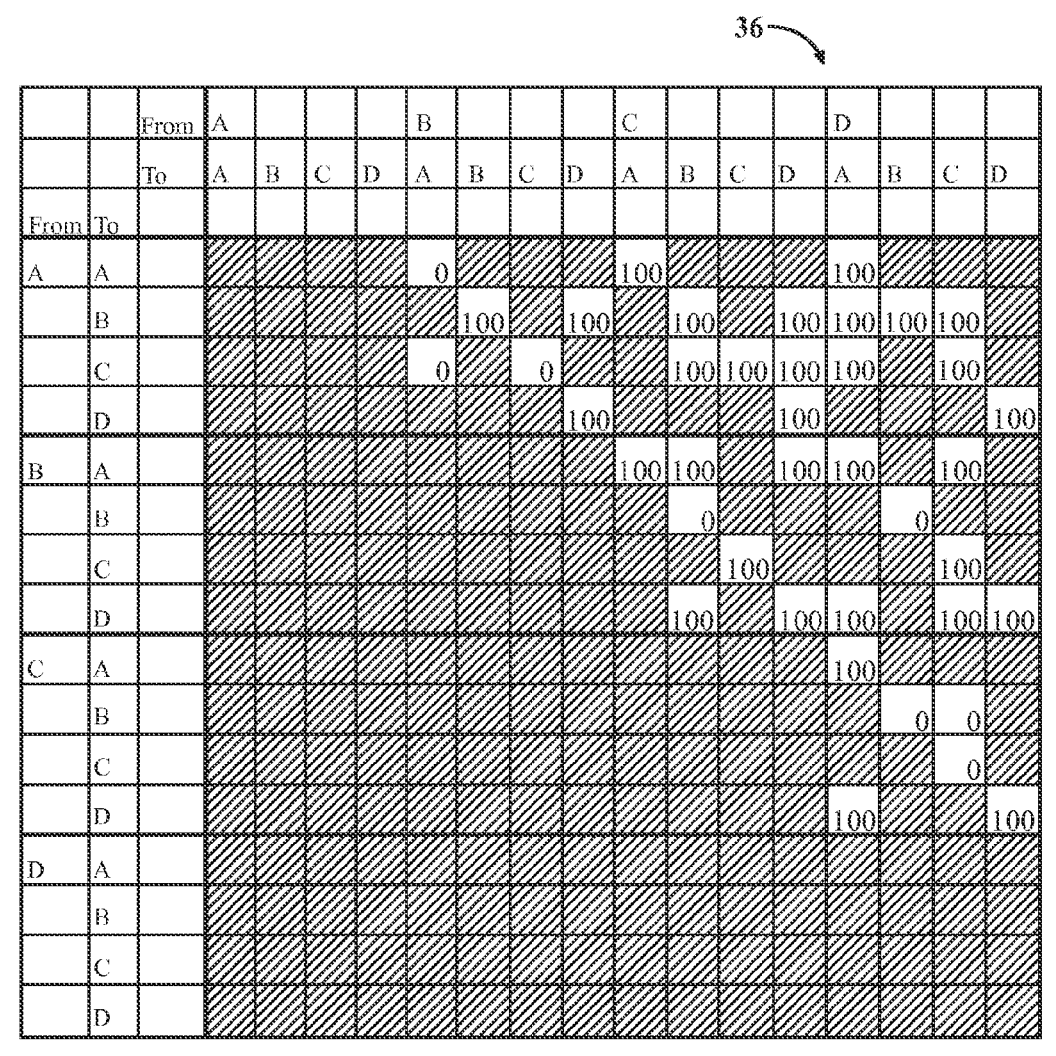

In a second example illustrated in FIGS. 6 and 7, an alternate intersection 26 is depicted. In this example, the intersection 26 comprises of a major road 40 with two side roads 42 having a stopping obligation. This stopping obligation may not be known or it may need verified prior to inclusion into the digital map 14. The intersection priority matrix 36 for this intersection 26 will look much different than the first. In this matrix 36 it can be clearly determined that a vehicle traveling from A-B will always have priority over a vehicle traveling from C-D. The intersection priority matrix 36 can be processed to derive or verify the presence of the stop signs 43 on the side roads 42 purely from the matrix data itself. Alternately, if the present of the stop signs was known, their presence can be verified. Although relatively simple matrixes have been illustrated, the present invention contemplates the use of far more complex matrixes that provide even more increased detail. For examine, it is contemplated that more complex matrixes including timing and the processing of multiple simultaneous probe traces 32 may be utilized to accommodate and identify temporal controls such as traffic lights or variations dependent on time of day (i.e. blinking stops that vary during rush hour).

It should be understood that not all probe data 24 or associated probe traces 32 may be accurate. Due to the nature and individuality of drivers and conditions a variety of questionable probe traces 44 may be found. These may arise from a wide variety of circumstances including, but not limited to, illegal u-turns, rolling stops, funeral processions. It is contemplated that the present invention may include algorithms directed at analyzing 200 the plurality of probe traces 32 to identify such questionable probe traces 44. These questionable traces 44 are preferably removed 210 prior to the selection 140 or probe traces 32 for processing. In other embodiments, however, these questionable traces 44 need not be removed as the large quantity of the probe data 24 will render them statistically insignificant.

The calculation of derived intersection priority settings 38 for a given intersection 26 be put to a number of contemplated usages. At the most basic, the derived intersection priority settings 38 can be added to the digital map data 14 such that it may be utilized by navigational equipment to advise drivers of upcoming intersections and provide advice on proceeding. Additionally, the derived intersection priority settings 38 may be utilized to update digital map data 14 already containing such information. This is highly valuable as there are constant changes to the roadway system. When stop signs get removed or installed, traffic lights get changed, road get expanded the present invention allows for the verification and/or correction of such information without requiring first hand knowledge of the changes. Since probe data 24 is constantly being received, it may also be constantly monitored for such changes.

Additionally, the derived intersection priority settings 38 may be highly valuable to law enforcement, department of motor vehicles, and roadway planners. An intersection with a known stop sign whose intersection priority matrix 36 indicates poor compliance could be indicative of a poorly placed or covered stop sign. Similarly the intersection priority matrix 36 may be analyzed to improve traffic flow through the intersection 26. By altering the existing intersection priority settings, through the addition of signs or lights, city planners can tailor an intersection to favor the heaviest traffic directions.

Finally, the derived intersection priority settings 38 may be incorporated 220 into the digital map 14 within a navigational device 10 as shown in FIG. 1. The navigational device 10 can then be utilized to communicate 230 the derived intersection priority setting 38 to a driver as the intersection 26 is approached. It is contemplated that this could be an audible communication or a visual representation 48.

The foregoing invention has been described in accordance with the relevant legal standards, thus the description is exemplary rather than limiting in nature. Variations and modifications to the disclosed embodiment may become apparent to those skilled in the art and fall within the scope of the invention. Accordingly, the scope of legal protection afforded this invention can only be determined by studying the following claims.

What is claimed is:

1. A method for determining vehicle priority settings at an intersection, comprising:
accumulating probe data from a plurality of individual navigation units;
selecting an intersection within a digital map; and
processing said probe data by:
    selecting from said probe data a plurality of probe traces at said intersection;
    selecting a pair of said probe traces which enter said intersection at the same time on different trajectories;
    determining which of said probe traces proceeds through said intersection first;
    repeating said processing on additional pairs of said plurality of probe traces; and
    deriving an intersection priority setting based on said determinations.

2. The method as described in claim 1, further comprising:
updating an intersection priority matrix with result of each of said determinations; and
utilizing said intersection priority matrix to calculate a derived intersection priority setting.

3. The method according to claim 1, further comprising:
analyzing said plurality of probe traces to identify questionable probe traces (44); and
removing said questionable probe traces prior to processing said plurality of probe traces.

4. The method according to claim 1, further comprising:
comparing said derived intersection priority setting to a known intersection priority setting to verify said known intersection priority setting.

5. The method as described in claim 4, further comprising:
using said comparison to evaluate the sufficiency of roadside markings at said intersection.

6. The method as described in claim 4, further comprising:
using said derived intersection priority to correct data within said digital map.

7. The method according to claim 1, further comprising:
using said derived intersection priority to enhance said digital map by adding said derived intersection priority to said digital map.

8. The method according to claim 2, further comprising:
utilizing said probe traces and said intersection priority matrix to optimize traffic flow patterns at said intersection.

9. The method according to claim 1, further comprising:
verifying the sufficiency of said probe data at said intersection.

10. A method of populating a digital map with intersection priority information, comprising:
accumulating a plurality of probe traces from a plurality of navigation units;
processing said plurality of probe traces by:
    selecting a pair of said probe traces which enter an intersection at the same time on different trajectories;
    determining which of said probe traces proceeds through said intersection first;
    repeating said processing on additional pairs of said plurality of probe traces; and
    deriving an intersection priority setting based on said determinations; and
updating a digital map with said derived intersection priority setting.

11. The method according to claim 10, further comprising:
updating an intersection priority matrix with result of said determinations; and
utilizing said intersection priority matrix to calculate a derived intersection priority setting.

12. The method according to claim 10, further comprising:
verifying the sufficiency of said probe traces at said intersection prior to updating said digital map.

13. The method according to claim 10, further comprising:
determining the presence of a traffic control means, such as a traffic light or a stop sign, at said intersection utilizing said intersection priority matrix.

14. The method according to claim 10, further comprising:
comparing said derived intersection priority setting to a known intersection priority setting to verify said known intersection priority setting.

15. The method according to claim 11, further comprising:
using said intersection priority matrix to evaluate the sufficiency of roadside markings at said intersection.

16. The method according to claim 10, further comprising:
analyzing said plurality of probe traces to identify questionable probe traces; and
removing said questionable probe traces prior to said selecting a pair of said probe traces.

17. The method according to claim 10, further comprising:
incorporating said digital map with said derived intersection priority setting into a navigational device; and
communicating said derived intersection priority setting to a driver as said navigational device approaches said intersection.

18. The method according to claim 10, further comprising:
incorporating said digital map with said derived intersection priority setting into a navigational device; and
providing a visual representation of said derived intersection priority setting as said navigational device approaches said intersection.

* * * * *